UNITED STATES PATENT OFFICE.

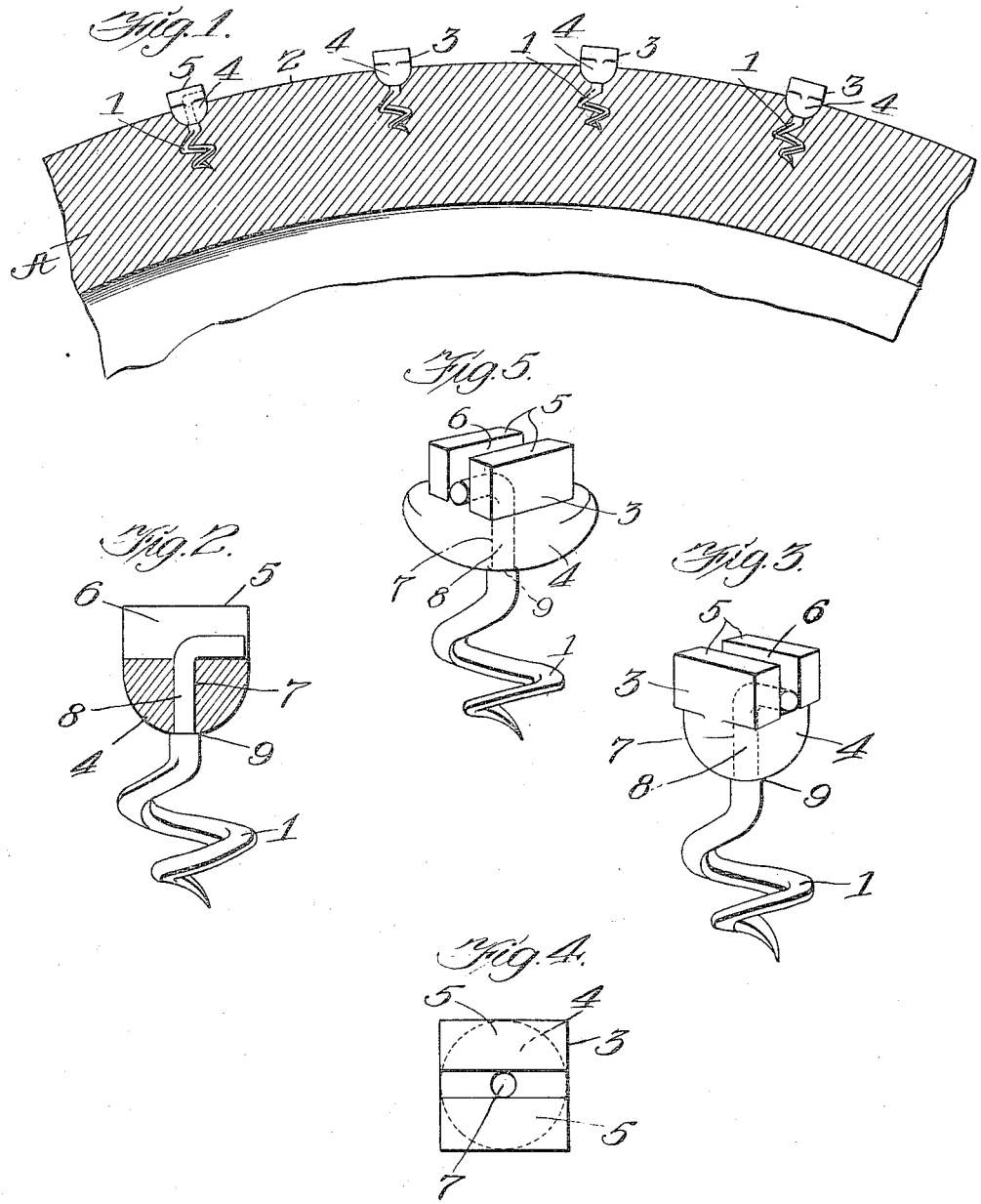

MELVILLE CLARK, OF CHICAGO, ILLINOIS.

ANTISKIDDING DEVICE FOR VEHICLE-WHEELS.

964,610.  Specification of Letters Patent.  Patented July 19, 1910.

Application filed October 18, 1909. Serial No. 523,241.

*To all whom it may concern:*

Be it known that I, MELVILLE CLARK, a citizen of the United States, residing at Chicago, in the county of Cook and State of Illinois, have invented new and useful Improvements in Antiskidding Devices for Vehicle-Wheels, of which the following is a specification, reference being had to the drawings forming a part thereof.

The purpose of this invention is to provide an improved device adapted to be engaged with the rubber tread member of the tire of a vehicle wheel for preventing the slipping of the wheel, particularly sidewise. It consists in the features of construction shown and described as indicated in the claims.

In the drawings:—Figure 1 is a section in the plane of the wheel of the segment of the tread member of a wheel tire equipped with these inventions. Fig. 2 is a sectional elevation on one of the anti-skidding devices, constituting the invention; section being made axially through the head member in the plane of a slot with which it is provided for the purposes herewith explained. Fig. 3 is a perspective view of such device. Fig. 4 is a top plan view of the same. Fig. 5 is a perspective view of a slightly modified form of the device.

The device shown in this application is designed as an improvement upon a somewhat similar device for like purpose for which my application, Serial No. 505876, filed July 3, 1909, is pending in the Patent Office.

In the drawings, A represents the rubber tread member of a vehicle wheel tire.

The device for preventing slipping, shown fully in Fig. 3, comprises a helical tang, 1, for engaging the tread member 2, of the tire and a head, 3, which constitutes the protruding portion for engagement with the pavement. In the device shown in my said pending application the head and tang are represented as made in one piece; but in practice it is difficult to make a tang having the desired toughness and resiliency in same piece with a head having the desirable size and hardness, without making the device unduly expensive; and the present invention aims to overcome this defect by providing a construction of the device in two pieces which is economical and effective, and has in addition certain other advantages over the form shown in my said pending application.

The head, 3, is made of a block of steel, having the lower portion, 4, which is designed to be embedded in the tire tread member, substantially hemispherical, and the upper portion, 5, which engages the pavement, angular,—preferably rectangular,—and provided with a slot 6, extending across it from side to side substantially of the full depth of the angular portion. From the bottom of the slot an aperture, 7, extends axially through the hemispherical portion, 4, the aperture being of diameter to receive snugly the upper slightly reduced portion, 8, of the tang, which is given such reduction of the upper portion, to form a shoulder, 9, stopping against the under side of said hemispherical portion. When thus inserted through the head the reduced stem, 8, of the tang protrudes into the slot, 6, a distance substantially equal to the radius of the spheroidal portion, and it is then bent down in the slot to the bottom thereof, as seen in Fig. 2, proper means being employed in the bending to clench it for drawing the shoulder, 9, snugly against the under side on the spheroidal end of the head. The device constructed is adapted to be screwed into the tread member of the tire, either by means of a wrench engaging the angular,—preferably square,—protruding portion, or by means of a screw driver engaging the slot, 6, and it is designed to be thus screwed down into the tire until the spheroidal lower end portion is substantially embedded, or sunken into the tire, as seen in Fig. 1. The spheroidal form of such end adapts it to be thus applied without mutilating the tire. As explained in my said pending application, the helical form of the tang and its spring character adapts it to yield with respect to the wheel, accommodating the compression of the tread member when under load, and thus preventing the alternating compression and expansion of the tire from causing it to cut its way out, as is liable to happen with a rigid threaded tang.

On some accounts it may be found preferable to make the spheroidal lower end of the head of greater diameter than the protruding portion for affording greater bearing surface on the tire, and in that case it may be made somewhat flatter as seen in Fig. 5.

I claim:—

1. An anti-skidding device for vehicle wheel tires comprising a helical spring tang member and a head member having a slot at the outer end and an aperture extending from the bottom of the slot, the tang having its stem inserted through the aperture and folded down in the slot.

2. An anti-skidding device for vehicle wheels, comprising a head member having one end spheroidal and the opposite end slotted and a screw tang having its stem inserted from the spheroidal end through the axial aperture of the head member and folded down in the slot thereof.

3. An anti-skidding device for vehicle wheels, comprising a head member having one end spheroidal and the opposite end angular and provided with a transverse slot, and having an aperture leading from the bottom of the slot extending axially through the spheroidal portion, in combination with a screw tang having its end reduced above the screw portion to form a shoulder and inserted into the spheroidal end of the head through the axial aperture, with its shoulder stopped against such spheroidal end, the upper end of the stem being folded down into the slot.

In testimony whereof, I have hereunto set my hand at Chicago, Illinois, this 7th day of October, 1909.

MELVILLE CLARK.

Witnesses:
CHAS. S. BURTON,
C. J. CHRISHOFFEL.